United States Patent
Tran et al.

(10) Patent No.: US 9,648,464 B1
(45) Date of Patent: May 9, 2017

(54) EFFICIENT ZONE BASED CLIENT COUNT FORECASTING

(71) Applicant: Cisco Technology, Inc., San Jose, CA (US)

(72) Inventors: Huy Phuong Tran, Portland, OR (US); Santosh Ghanshyam Pandey, Newark, CA (US); Abhishek Bhattacharyya, San Francisco, CA (US); Preethi Natarajan, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/151,081

(22) Filed: May 10, 2016

Related U.S. Application Data (60) Provisional application No. 62/298,015, filed on Feb. 22, 2016.

(51) Int. Cl.
  *H04W 4/02* (2009.01)
  *H04W 64/00* (2009.01)
  *H04W 28/26* (2009.01)
  *H04W 24/10* (2009.01)

(52) U.S. Cl.
  CPC ........... *H04W 4/028* (2013.01); *H04W 24/10* (2013.01); *H04W 28/26* (2013.01); *H04W 64/00* (2013.01)

(58) Field of Classification Search
  CPC ..... H04W 4/028; H04W 64/00; H04W 24/10; H04W 28/26
  USPC .......................... 455/456.1–457, 414.1–414.4
  See application file for complete search history.

(56) References Cited

U.S. PATENT DOCUMENTS

| | | | |
|---|---|---|---|
| 4,700,295 A | 10/1987 | Katsof et al. | |
| 5,541,835 A | 7/1996 | Dextraze et al. | |
| 7,996,256 B1 * | 8/2011 | Anand | G06Q 30/02 705/7.29 |
| 8,229,458 B2 | 7/2012 | Busch | |
| 8,229,781 B2 * | 7/2012 | Zenor | G06Q 30/02 705/7.31 |
| 8,768,867 B1 | 7/2014 | Thaeler et al. | |
| 8,818,351 B1 * | 8/2014 | Crossno | G06Q 10/08 370/241.1 |

(Continued)

OTHER PUBLICATIONS

Gao, et al., "Mobile Location Prediction in Spatio-Temporal Context," Nokia Mobile Data Challenge Workshop, Jun. 2012, 4 pages.

(Continued)

*Primary Examiner* — Sharad Rampuria
(74) *Attorney, Agent, or Firm* — Edell, Shapiro & Finnan, LLC (57) ABSTRACT

An efficient process is provided that exploits features in historical and current client location data to forecast client counts of different zones up to several hours ahead. These features may be obtained from correlations of client counts of multiple zones in a recent and long period of time. These features may also be combined using techniques that choose the best performing method for a particular dataset and a particular lookahead time. This process provides better forecast/prediction on the zone-based client count data, and is very useful in customer analytics which can now show the future predicted value. This can help the analytics customers to plan their operations based on the location analytics.

19 Claims, 7 Drawing Sheets

(56) References Cited

U.S. PATENT DOCUMENTS

| | | | | |
|---|---|---|---|---|
| 2008/0248815 A1* | 10/2008 | Busch | ............... | H04W 4/02 455/456.5 |
| 2015/0011196 A1* | 1/2015 | Jayakumar | ............ | H04W 4/028 455/418 |

OTHER PUBLICATIONS

Nassauer, "Wal-Mart Cuts Workers' Hours as Some Stores," The Wall Street Journal, http://www.wsj.com/articles/wal-mart-reduces-worker-hours-at-some-stores-to-lower-expenses-1441046019, Aug. 31, 2015, 3 pages.

Nopiah, et al., "The Use of Autocorrelation Function in the Seasonality Analysis for Fatigue Strain Data," Journal of Asian Scientific Research 2(11), Nov. 2012, pp. 782-788.

IPSOS Retail Performance, "Why Queuing is the new battleground for retailers," May 24, 2013, 3 pages.

Quddus, "Time Series Count Data Models: An Empirical Application to Traffic Accidents," Accident Analysis and Prevention, 40 (5), Sep. 2005, pp. 1732-1741.

Hyndman, et al., "Another Look at Measures of Forecast Accuracy," International Journal of Forecasting 22 (2006), Dec. 2006, pp. 679-688.

Hyndman, et al., "Exponential Smoothing," Forecasting: Principles and Practice, Chapter 7, Sep. 2014, 1 page.

Hyndman, et al., "Non-seasonal ARIMA models," Forecasting: Principles and Practice, Chapter 8.5, Sep. 2014, 5 pages.

Hyndman, et al., "Seasonal ARIMA models," Forecasting: Principles and Practice, Chapter 8.9, Sep. 2014, 10 pages.

Hyndman, et al., "Vector autoregressions," Forecasting: Principles and Practice, Chapter 9.2, Sep. 2014, 4 pages.

Gao, et al., "Exploring Social-Historical Ties on Location-Based Social Networks," ICWSM-12, Jun. 2012, 8 pages.

Ferland, et al., "Integer-Valued Garch Process," Journal of Time Series Analysis, Nov. 2006, 21 pages.

Fokianos, et al., "Poisson Autoregression," Journal of the American Statistical Association, vol. 104, No. 488, Dec. 2009, 10 pages.

Heinen, "Modelling Time Series Count Data: An Autoregressive Conditional Poisson Model," http://mpra.ub.uni-muenchen.de/8113/, Jul. 2003, 38 pages.

Maiti, et al., "Coherent forecasting for count time series using Box-Jenkin's AR(p) model," Statistica Neerlandica, vol. 70, Issue 2, Oct. 2015, pp. 123-145.

Alzaid, et al., "An Integer-Valued pth-Order Autoregressive Structure (INAR(p)) Process," Journal of Applied Probability, vol. 27, No. 2, Jun. 1990, pp. 314-324.

Box, et al., "Linear Nonstationary Models," Chapter Four, Time Series Analysis, Fourth Edition, Jun. 2008, 44 pages.

R. Cleveland et al., "STL: A Seasonal-Trend Decomposition Procedure Based on Loess", Journal of Official Statistics, vol. 6, No. 1, 1990, pp. 3-73, Statistics Sweden, 31 pages.

C. Koehler et al., "Indoor-ALPS: An Adaptive Indoor Location Prediction System", UbiComp '14, Sep. 13-17, 2014, Seattle, WA, USA, ACM 978-1-4503-2968-2/14/09, http://dx.doi.org/10.1145/2632048.2632069, 12 pages.

R. Yan et al., "Citation Count Prediction: Learning to Estimate Future Citations for Literature", CIKM'11, Oct. 24-28, 2011, Glasgow, Sctoland, UK, Copyright 2011 ACM 978-1-4503-0717-8/11/10, 6 pages.

Manjunatha J N et al., "Citation Prediction Using Time Series Approach" KDD Cup 2003 (Task 1), SIGKDD Explorations, vol. 5, Issue 2, 2 pages.

\* cited by examiner

EFFICIENT ZONE BASED CLIENT COUNT FORECASTING

CROSS-REFERENCE TO RELATED APPLICATIONS

This application claims priority to U.S. Provisional Patent Application No. 62/298,015, filed on Feb. 22, 2016, the entirety of which is incorporated by reference herein.

TECHNICAL FIELD

The present disclosure relates to wireless networking environments.

BACKGROUND

Organizations such as retail stores, airports, casinos, etc., that have a variable number of customers in different zones over time, want to have an efficient way to improve both customer satisfaction and benefits. At the same time, many organizations want to improve resource utilization to cut operational expenses. As a result, there is a challenge in efficient resource preparation to achieve these goals. This leads to the area of forecasting the number of people in a given zone.

DESCRIPTION OF EXAMPLE EMBODIMENTS

Overview

Presented herein is a process that can exploit features in historical and current client location data to forecast client counts of different zones in a lookahead window of time in the future (e.g., several hours ahead). In one example, at a server in communication with one or more wireless access point devices, information of a location is obtained for a plurality of wireless client devices located in one or more zones over a period of time based on a plurality of measurement data associated with signals received at the one or more wireless access point devices from respective ones of the plurality of wireless client devices. A historical client count time series is determined within each of the zones based on the location for each of the client devices over the period of time and map information of the one or more zones. Client counts are predicted in at least one of the zones over a specified window of time in the future by selecting one or more predictive methods from a plurality of stored predictive methods and generating predicted client counts in at least one of the zones for the specified window of time using the selected one or more predictive methods and the historical client count time series, and the predicted client counts in at least one of the zones are reported. The predicted values may be obtained from correlations of client counts of multiple zones in a recent and long period of time, for example by use of techniques that choose the best performing method for a particular dataset and a particular lookahead time. This process provides better forecast/prediction on the zone-based client count data, and is very useful in customer analytics which can show the future predicted value. This can help the analytics customers to plan their operations based on the location analytics.

EXAMPLE EMBODIMENTS

Figure 1:
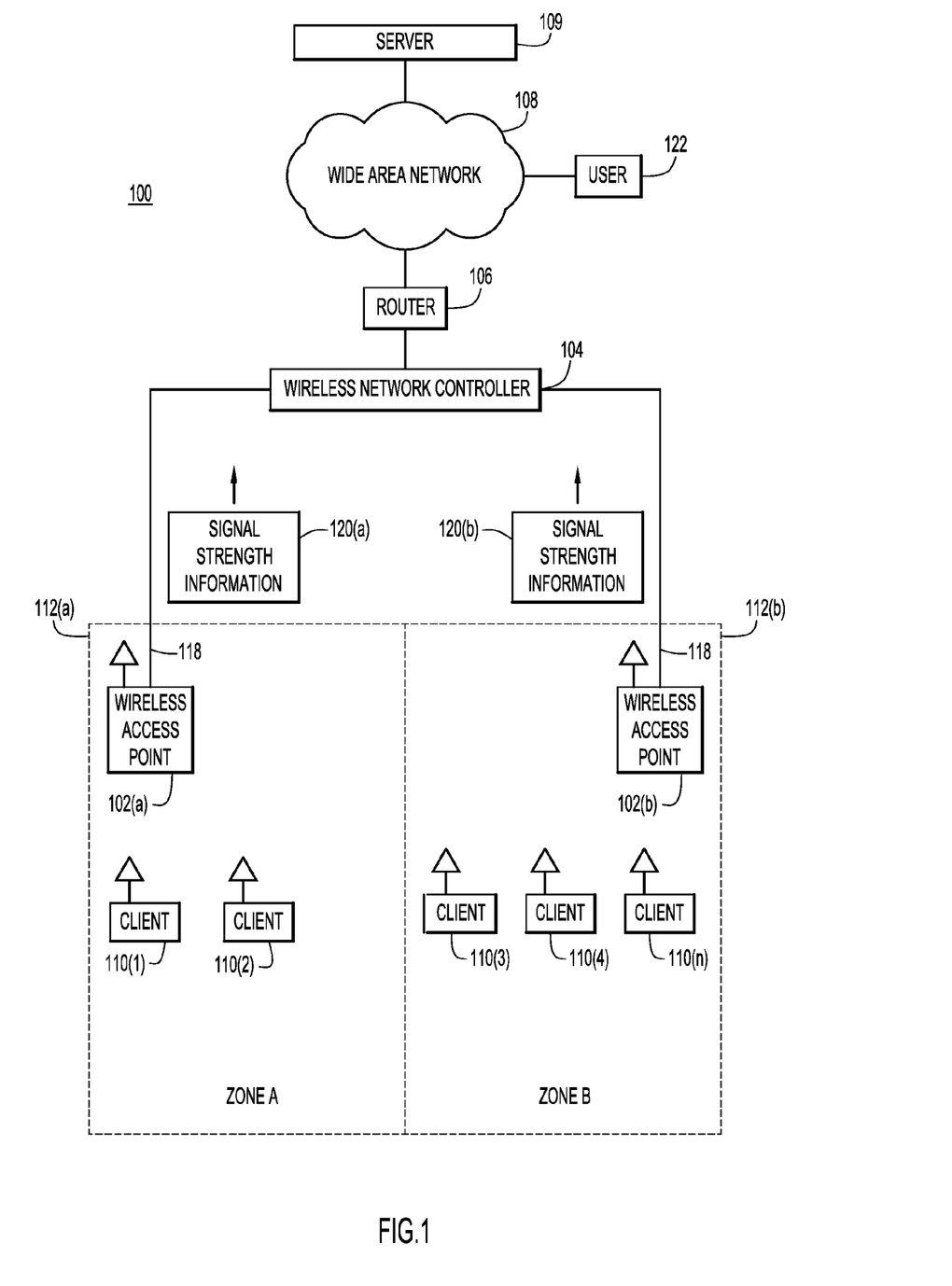
FIG. 1 is a block diagram showing an example of a wireless network in which the efficient zone based client count forecasting may be deployed, according to an example embodiment.

An example wireless local area network (WLAN) is shown at reference numeral 100 in FIG. 1. The WLAN 100 comprises a plurality of wireless access point devices ("wireless access points" or "wireless APs"), two of which are shown at reference numerals 102(a) and 102(b). Each of the wireless APs is configured to communicate over a wired or wireless mesh network connection with a wireless network controller device 104 ("wireless network controller," "wireless controller" or "controller device") that controls the APs. The wireless network controller device 104 is, in turn, configured to communicate with a router device 106 ("router") which is connected to a wide area network (WAN) 108 (e.g., the Internet). The WLAN 100 also has a plurality of wireless client devices 110(1)-110(n) ("wireless clients," "client devices" or "clients").

The wireless APs 102(a) and 102(b) are configured to wirelessly transmit traffic to and receive traffic from the clients 110(1)-110(n) that they serve, e.g., according to the Institute of Electrical and Electronic Engineering (IEEE) 802.11 standard. The wireless APs 102(a) and 102(b) may be deployed in one or more zones within a particular geographic region, e.g., in two zones 112(a) and 112(b) as shown in FIG. 1. In one example, the zones 112(a) and 112(b) in FIG. 1 may represent defined areas within a building or other defined region (e.g., a floor) within a building and in which the wireless APs 102(a) and 102(b) are deployed to provide network connectivity to clients. The geographic zones 112(a) and 112(b) may correspond to actual locations having a physical boundary (e.g., rooms). Alternatively, the zones 112(a) and 112(b) may correspond to areas having a predefined boundary set by a network administrator, e.g., at the server 109 or at a remote user device 122 in communication with the server over network 108. Thus, for example, the zone 112(a) may correspond to a first checkout zone in a store, and the zone 112(b) may correspond to a second checkout zone in a store.

The clients 110(1)-110(n) are mobile devices (e.g., mobile phones, tablets, computing devices, laptops, etc.) that may be configured to move about with respect to the wireless APs 102(a)-102(b) in the WLAN 100. For example, a human operator, using a mobile phone to access the WAN 108 via one of the wireless APs 102(a) and 102(b), may walk within one of zones 112(a) and 112(b) or walk from one zone to the other zone. Thus, the location of the clients 110(1)-110(n) may change as human operators/users of the clients move around. The clients may also include static wireless devices (e.g., wireless printers) in a zone, and such "static" or stationary wireless devices would contribute a static count to a zone.

The wireless network controller 104 is a network device that is configured to receive traffic (e.g., audio, video and/or any type of data communications) from the WAN 108 (via the router 106) and to deliver the traffic to the appropriate one of the wireless access points 102(a) and 102(b) for ultimate delivery to the clients. Thus, the wireless network controller 104 may be arranged in a local area network (LAN) with the wireless APs 102(a) and 102(b). The LAN is shown in FIG. 1 at reference numeral 118 as connections (e.g., wired or wireless connections) between the wireless APs 102(a) and 102(b) and the wireless network controller 104. For example, in FIG. 1, wireless APs 102(a) and 102(b) are in communication with, and under control of, the wireless network controller 104, and thus, the wireless network controller 104 is configured to deliver traffic from the WAN 108 to wireless APs 102(a) and 102(b) for ultimate wireless transmission to a client, and to receive traffic from clients and direct it to the WAN 108. Techniques for determining the location of one or more of the clients 110(1)-110(n) in multiple zones may be performed by the wireless network controller 104 or by another processing device in the network 100, e.g., a mobility services engine, in communication with the wireless access points 102(a) and 102(b) and/or the wireless network controller 104, and running on a server 109 connected to the wide area network 108. For simplicity, the determination of client location is described as being performed by the server 109, and it should be appreciated that the determination may be performed by other processing devices in the network 100 (such as the controller 104). There are numerous techniques that are known to compute the location of clients in a WLAN, based on signals received from the clients at APs.

The router 106 is a network device configured to enable communications to be routed from the WAN 108 to the wireless network controller 104 (e.g., for ultimate transmission to one or more of the wireless APs 102(a) and 102(b) and one or more clients 110(1)-110(n)). The router 106 also enables traffic to be routed from the wireless controller 104 (e.g., received by one or more of the wireless APs 102(a) and 102(b) and originating from one or more of the clients 110(1)-110(n)) to the WAN 108.

As stated above, the wireless APs 102(a) and 102(b) are configured to send wireless communications to, and receive wireless communications from, one or more clients 110(1)-110(n) that they serve. As shown in FIG. 1, each of the clients 110(1)-110(n) has at least one antenna to enable the wireless communications. Likewise, the wireless APs 102(a) and 102(b) also have one or more antennas to enable the wireless communications. In FIG. 1, wireless AP 102(a) serves clients 110(1) and 110(2), both of which are located in a first zone 112(a) of a larger area. Wireless AP 102(b) serves clients 110(3) and 110(4), located in a second zone 112(b) in the larger area, and also serves client 110(n), located in the second zone. The wireless APs 102(a) and 102(b) are configured to measure information indicative of the strength of signals exchanged with a client device that the wireless AP serves. For example, wireless AP 102(a) is configured to measure information indicative of the signal strength ("signal strength information") between client 110(1) and wireless AP 102(a) and also between client 110(2) and wireless AP 102(a). Likewise, wireless AP 102(b) is configured to measure signal strength information between client 110(3) and wireless AP 102(b), between client device 110(4) and wireless AP 102(b) and between client device 110(n) and wireless AP 102(b). The signal strength information may be, for example, received signal strength information (RSSI) measurements that are particular to specific client devices. For example, wireless AP 102(a) may measure an RSSI for signals received from each of client 110(1) and client 110(2), and wireless AP 102(b) may measure an RSSI for signals received from each of client 110(3), client 110(4) and client 110(n).

Wireless AP 102(a) and wireless AP 102(b) are each configured to send the signal strength information, measured for signals received from each respective client that the wireless APs serve, to the wireless network controller 104 via the LAN 118. FIG. 1 shows wireless AP 102(a) sending signal strength information 120(a) to the wireless network controller 104 and shows wireless AP 102(b) sending signal strength information 120(b) to the wireless network controller 104. The signal strength information 120(a) and 120(b) represent, e.g., the RSSI measurements for signals received from the clients served by each respective wireless AP. For example, the signal strength information 120(a) may contain an RSSI measurement for signals received from client 110(1) and an RSSI measurement for signals received from client 110(2). Likewise, the signal strength information 120(b) may contain an RSSI measurement for signals received from client 110(3), from client 110(4) and from client 110(n). The wireless network controller 104 may send the signal strength information 120(a) and 120(b) to server 109, which in an embodiment, uses the information (e.g., the RSSI information) for the clients 110(1)-110(n) to determine the location of the clients relative to the boundaries of one or more zones.

It should be understood that even if a client device is not "associated" to an AP, it still will transmit a probe request on an occasional basis, in order to continuously be aware of a WLAN in its vicinity. The probe request received by an AP can be used for determination the location of the source client device that transmitted the probe request. Other signals that devices which operate in accordance with the IEEE 802.11 standard employ may be used to obtain information needed to compute the location of a client. While location calculation based on RSSI measurements is described, it will be appreciated that other procedures can be used to calculate location, such as Angle-of-Arrival or Time-Difference-of-Arrival, for example.

In accordance with an embodiment, historical and current estimated client device (e.g., phone) locations generated by location platforms deployed in buildings and zones (e.g., checkout, check-in zones) may be used by one or more networked devices to predict (forecast) the number of people in different zones up to several hours ahead. These techniques can use the predicted number of people (client counts) to do resource preparation efficiently.

This process uses an efficient algorithm that may exploit features in historical and current wireless client device location data to forecast client counts of different zones up to several hours ahead. These features may be obtained from correlations of client counts of multiple zones in a recent and long period of time. In general, the algorithm includes the following steps: pre-processing, down-sampling, decomposition, modeling, and forecasting (prediction). The steps may be performed by a device in the network on a continuous basis, at predetermined times or time intervals, in response to a predetermined event or conditions, or in response to a customer request for a client count forecast.

Figure 2:
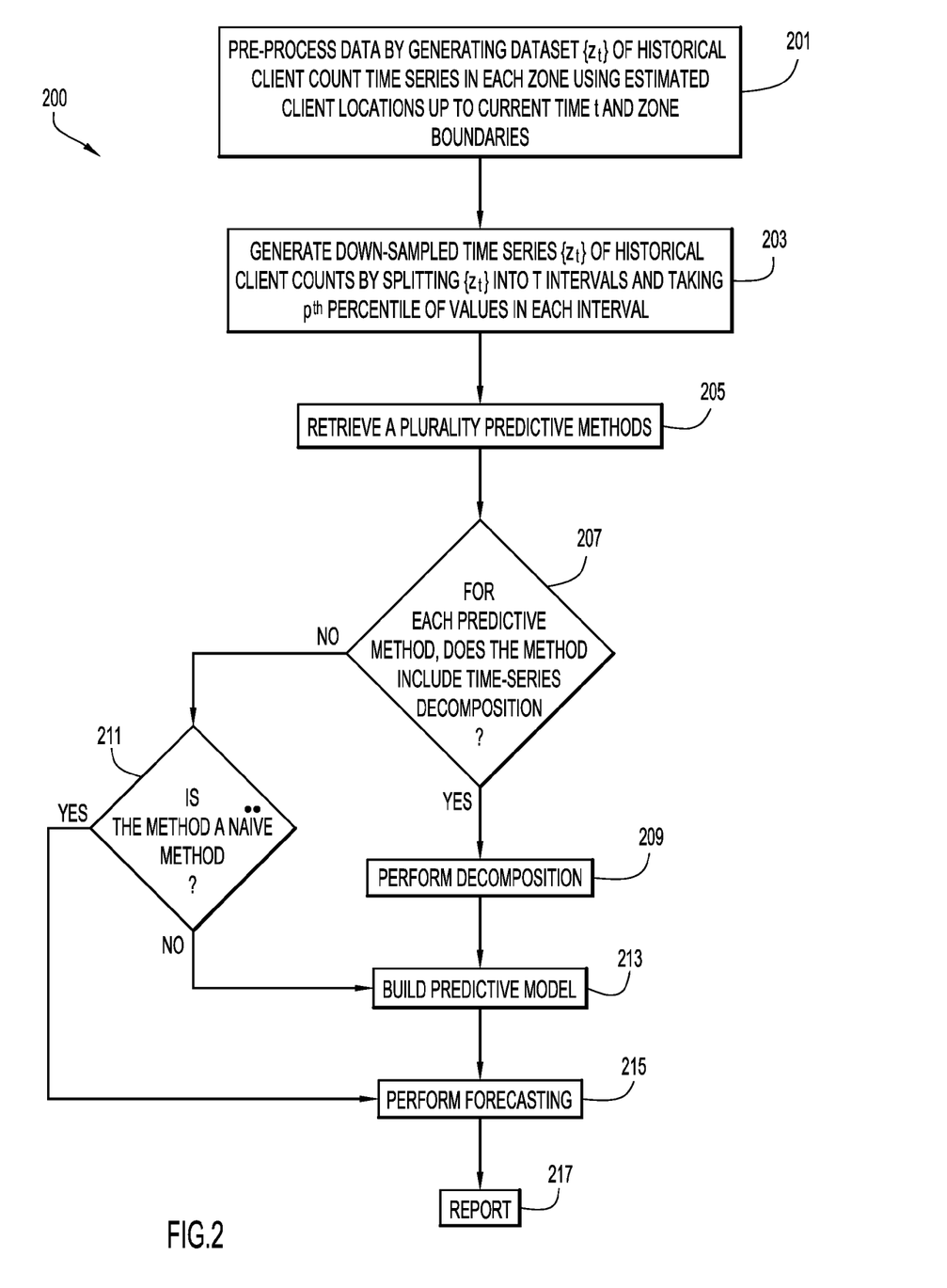
FIGS. 2 and 3 are flowcharts showing operations of a method for performing efficient zone based client count forecasting according to an example embodiment.

Reference is now made to FIG. 2, which shows a flow chart 200 depicting operations performed by server 109 in accordance with an example embodiment. The pre-processing step 201 is for mapping client device locations to customer-defined zones to generate time-series of numbers of people (client counts) in these zones. The server 109 receives signal strength information 120(a) and 120(b) from the network controller 104 and estimates the location of each of the client devices 110(1)-110(n) based on the signal strength information. The server 109 may store the estimated client locations from the time that it starts estimating (e.g., time 0) until the current time t. Given this client location information and data regarding the boundaries of the zones (e.g., coordinates defining zones 112(a) and 112(b)), the server 109 can calculate the client counts in each zone over time. The result of this step is a dataset of historical time series of client counts for each zone, which may be stored by the server 109.

In the down-sampling step 203, the server 109 divides each dataset of historical client count time series from step 201 into time intervals and takes only one sample in each time interval to reduce the number of samples and to reduce noise in the dataset. The sample may be a $p^{th}$ percentile of values (client counts) in the interval. For example, let $\{z_t\}$ be a historical client count time series in the dataset generated by the pre-processing step 201. First, the server 109 may split $\{z_t\}$ into fragments of T samples. Then, the server 109 may calculate the $p^{th}$ percentile of the client counts in each fragment. The result is a down-sampled time series $\{y_t\}$ having [t/T] samples. The down-sampling step 203 may be performed for all of the historical client count time series datasets to generate corresponding down-sampled time series for predicting client counts, and the down-sampled datasets may be stored by the server 109. In an embodiment, the server 109 may compute the medians ($50^{th}$ percentile) of the client counts in each fragment or interval. With this selection approach, it is possible to keep some information of the values in the interval while reducing the sample space.

In step 205, the server 109 retrieves a plurality of predictive methods to make a plurality of predictions for each $y_{t+h}$ where h is in [T,H] (h is the multiple of T) using down-sampled datasets. A plurality of different prediction methods are used for each $y_{t+p}$, such as model methods that do not take into account seasonality, model methods with deseasonalization and reseasonalization, and naïve methods. All of the approaches may have the same pre-processing and down-sampling steps. Examples of model methods without deseasonalization/reseasonalization that can be used include:

Linear regression with short trend (LRShortTrend) model in which recent h hours of client counts in a zone are modeled with linear regression and the continuation of the fitted linear line is used to forecast client counts for h hours ahead;

Exponential smoothing (ETS) model in which an observation $y_t$ in a zone is the weighted sum of the past observations and an error $e_t$ (withdrawn from a normal distribution with mean 0 and variance $\sigma^2$);

Autoregressive integrated moving average (ARIMA) model that is a combination between a moving average (MA) model, an autoregressive (AR) model, and a difference operator; and Vector autoregressive (VectorAR or VAR) model, which is a generalization of an AR model for modeling and predicting multiple time series. That is, in the VAR model, an observation depends on the past observations in multiple time series.

Examples of model methods with deseasonalization/reseasonlization include combinations of the above models with Seasonal and Trend decomposition using Loess (STL), which is a time-series decomposition technique that accounts for seasonality. Examples of such combinations include:

STL.Week.LRShortTrend and STL.Day.LRShortTrend, which are combinations of time-series decomposition with seasonal span as day/week and LRShortTrend;

STL.Week.ETS and STL.Day.ETS, which are combinations of time-series decomposition with seasonal span as day/week and ETS;

STL.Week.ARIMA and STL.Day.ARIMA, which are combinations of time-series decomposition with seasonal span as day/week with ARIMA; and STL.Week.VectorAR and STL.Day.VectorAR, which are combinations of time-series decomposition with seasonal span as day/week and VectorAR.

Examples of naïve methods that can be used include:

Naïve last method that uses the current observation $y_t$ as the predicted observations $y_{t+i}$ for all in in [1,h];

Naïve mean method that uses the mean of historical and current client counts as forecasted client counts; and Naïve season method that uses the corresponding observation in the previous season $y_{t+i-m}$ (where m is the length of the season (e.g., day or week)) as the predicted observation $y_{t+i}$ for all i in [1,h] with h≤m.

At step 207, for each predictive method, a determination is made whether the method includes time-series decomposition. For methods that include time-series decomposition, a deseasonalization or decomposition step 209 is performed by the server 109 before building the models. The decomposition step 209 exploits the correlation in the long term (e.g., days, weeks) by extracting seasonality (a pattern of client counts over days or weeks) from a down-sampled count time series. The decomposition step 209 may use the STL method to decompose a time series $\{y_t\}$ into two different time series: a season time series $\{season_t\}$ that captures seasonality in the original down-sampled time series, and a seasonally adjusted time series $\{seasonally\_adjusted_t\}$ that is the result of removing seasonality from the down-sampled time series. That is:

$$\{y_t\}=\{season_t\}+\{seasonally\_adjusted_t\}$$

At step 211, for each method that does not include time-series decomposition, the server 109 determines whether the method is a naïve method. For methods that require modeling (e.g., methods other than naïve methods) and methods that include time-series decomposition, a modeling step 213 is performed by the server 109 before predicting client counts in step 215. For naïve methods, on the other hand, the prediction step 215 can be performed without performing decomposition or modeling. In the modeling step 213, models are built that take into account the original time-series or seasonally adjusted time series to forecast the number of people in different zones in several hours ahead. These models learn correlations of client counts of single or multiple zones in a recent period of time, and in a long period of time. The modeling step 213 builds several different models to exploit the short-term temporal correlation of client counts. One or more of the following models may be built: a univariate model and a multivariate model. A univariate model represents the correlation of client counts in a single time-series. Examples of univariate models that may be built according to embodiments include the ETS model and the ARIMA model. A multivariate model represents the correlation of client counts between and within multiple time-series. Examples of multivariate models that may be built according to embodiments include the VectorAR model. These models are used by the server 109 to represent the correlation of client counts within and between down-sampled time series $\{y_t\}$. Also, the combination of these models and the STL method can be used to represent the correlation of client counts within and between seasonally adjusted time series {seasonally_adjusted$_t$}. In an embodiment, the server 109 builds six different models in step 207: three models (ETS, ARIMA, and VectorAR) for $\{y_t\}$ and three other models (STL.ETS, STL.ARIMA, and STL.VectorAR) for {seasonally_adjusted$_t$}.

In the forecasting step 215, the server 109 makes different predictions for each $y_{t+h}$ where h is in [T,H] (h is the multiple of T) by using different predictive methods, e.g., selected from the model methods and naïve methods described above. In other words, a different method may be used for each specified lookahead time $y_{t+h}$ in each zone. For example, a naïve method may be used for one lookahead time and a model method may be used for another lookahead time. In an embodiment, described below with reference to FIG. 3, the best method for each lookahead time h (T≤h≤H) is selected based on a prediction error metric, such as mean absolute prediction error or root mean square error. The selection may also take into account a relative computational time (e.g., in comparison with a NaïveLast approach). It will be appreciated that other methods of selection can be used, such as rules specifying a particular predictive method for a particular range of lookahead times. The combination of selected methods may be used to provide predictions for each of the lookahead times within the requested forecast window. For each model exploiting seasonally adjusted time series of client counts, this step adjusts the predicted value seasonally_adjusted$_{t+h|t}$ by adding the corresponding historical value $y_{t+h-m|t}$ in the previous season (m is the length of the season (e.g., day or week)).

The predicted client counts for each specified lookahead time $y_{t+h}$ may be reported in step 217. For example, a report may be generated and sent electronically (e.g., over network 108) to users 122 responsible for preparing and/or allocating resources to service clients. The report may include graphs and/or charts showing predicted client counts in each zone at one or more lookahead times. Reports may be sent periodically, at specific times, in response to specified conditions, or upon request. The server 109 may make predicted client counts available to users over the Internet, e.g., by displaying the information on a website accessible to users 122 via a web browser. The server 109 may also store predicted client counts for later use.

Figure 3:
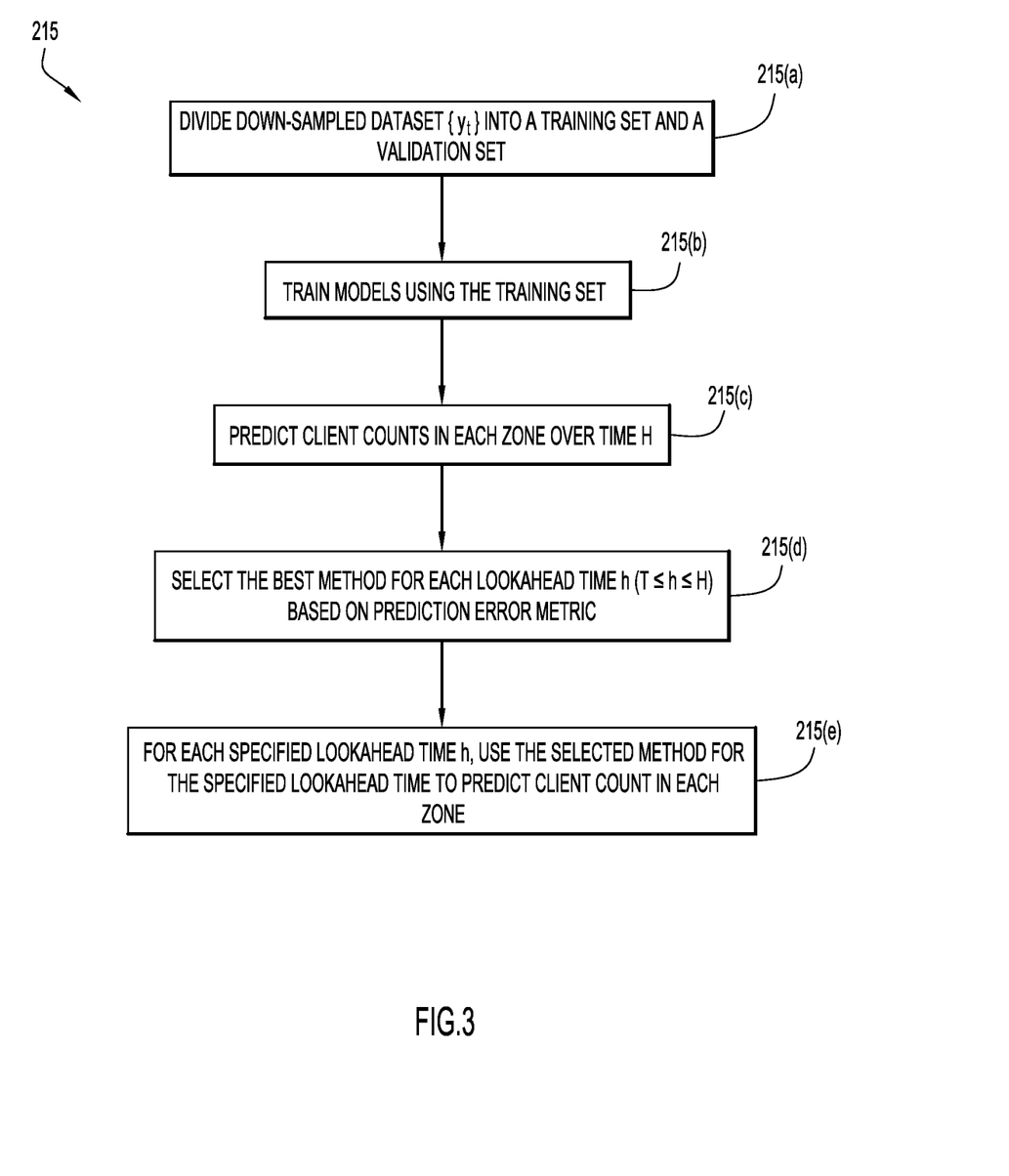

Reference is now made to FIG. 3, which shows exemplary steps that may be involved in performing the forecasting step 215 in accordance with an embodiment. In step 215(*a*), the down-sampled dataset $\{y_t\}$ is divided into a training set and a validation set.

In step 215(*b*), the methods that include models (e.g., ETS, ARIMA, VectorAR, STS.ETS, STS.ARIMA, and STS.VectorAR) are trained using the training set.

In step 215(*c*), each method is used to predict client counts in each zone over time H.

In step 215(*d*), the best method for each lookahead time is selected based on a prediction error metric. To measure the prediction error of a method for a zone, independent metrics such as Mean Absolute Error (MAE) can be used. To compare or combine prediction errors of different methods, dependent metrics such as Mean Absolute Percentage Error (MAPE) and Mean Absolute Scaled Error (MASE) can be used.

For example, if h is a lookahead time and multiple of T (h≤H), $y_{t+h|t}$ is the predicted client count at time t+h given the historical client counts until time t (the training set), and $y_{t+h}$ is the actual client count at time t+h, MAE and MAPE are given by:

$$MAE = \text{mean}(|y_{t+h|t} - y_{t+h}|)$$

$$MAPE = \text{mean}(100 \times (|y_{t+h|t} - y_{t+h}|)/(y_{t+h}+1))$$

The original version of MAPE represents the average of the ratio between an absolute prediction error and an actual client count $y_{t+h}$. Since $y_{t+h}$ can be equal to zero, one is added to both $y_{t+h|t}$ and $y_{t+h}$ to avoid the problem of division by zero.

If $y_i$ is a sample in a client count time series $\{y_t\}$ in the training set, with respect to the one-step prediction with the NaïveLast method, $y_{i-1}$ is the predicted value of $y_i$. Thus, the mean of the absolute difference between the two consecutive values in $\{y_t\}$ represents the in-sample mean absolute error of the one-step NaïveLast method:

$$\text{insample\_MAE}_t = \text{mean}(|y_i - y_{i-1}|).$$

MASE represents the average of the ratio between an absolute prediction error and the in-sample mean absolute error of the one-step NaïveLast method, as follows:

$$MASE = \text{mean}((|y_{t+h|t} - y_{t+h}|)/\text{insample\_MAE}_t).$$

In step 215(*e*), for each specified time h, the server 109 uses the method that was selected for that specified time to predict client count in each zone.

In an embodiment, the server 109 may apply an origin rolling forecasting framework. In this framework, part of the dataset is used for training. With the initial training set, client counts for an h hour look-ahead window are forecasted. After getting the forecasting errors for this window, the server can add real client counts in this window into the training set and perform forecasting for the next h hour look-ahead window. The testing may be repeated until the end of the dataset.

Figure 4:
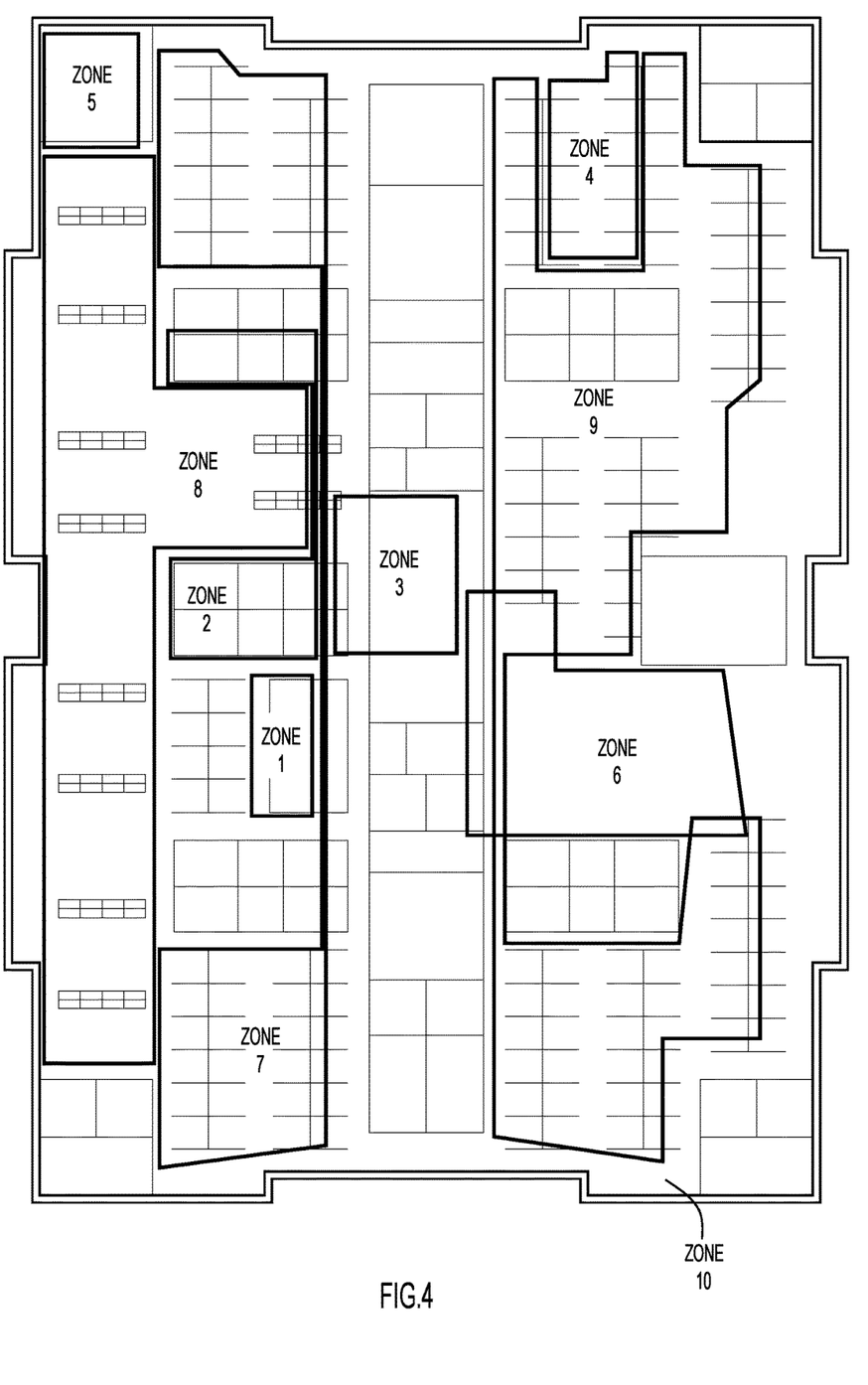
FIG. 4 is a map showing a floorplan with zones that may be used as a data set for efficient zone based client count forecasting according to an example embodiment.

FIG. 4 is a map showing a floorplan with zones 1-10 that may be used as a data set for efficient zone based client count forecasting according to an embodiment. In this example, the map shows the boundaries of 10 different zones in a floor of an office building. Wireless access points are deployed at various locations around the floor of the office building and used to determine the locations of client devices as they are moved about the floor over time.

Figure 5:
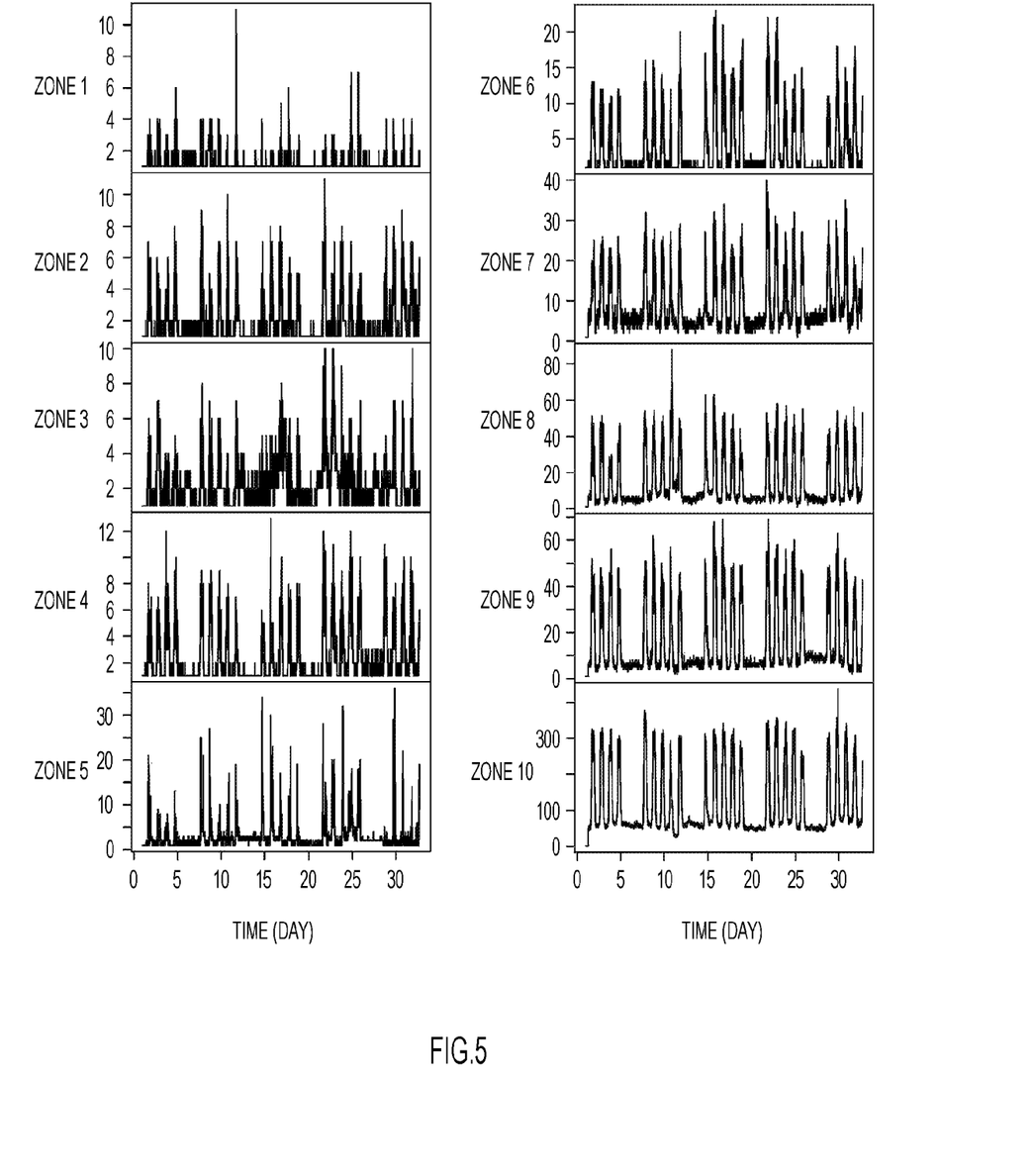
FIG. 5 is a graph showing an example of client count as a function of time in multiple zones that may be used as a data set for efficient zone based client count forecasting according to an example embodiment.

FIG. 5 is a graph showing an example of client count as a function of time in multiple zones after down-sampling that may be used as a data set for efficient zone based client count forecasting according to an embodiment. In this example, client counts of ten different zones in a floor of an office building are sampled every one second over five weeks. It can be seen that the means of the client counts are higher from Zone 5 to Zone 9. Zone 10 has the highest mean of client counts because it covers the largest area. All of the zones have clear seasonality (day, week) except Zone 1 and Zone 3. Also, it can be seen that client counts are higher on weekdays than weekends in this example.

Figure 6:
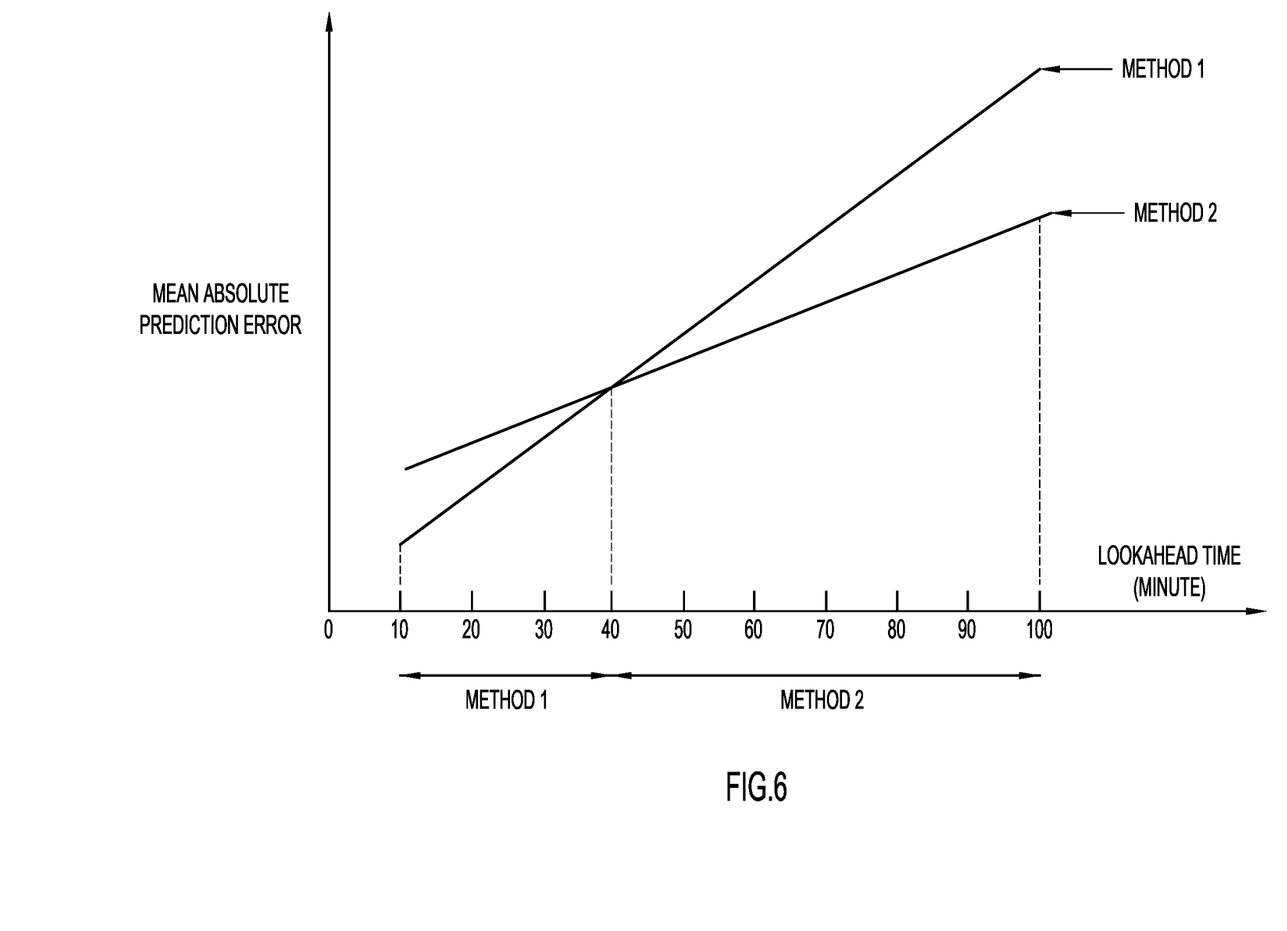
FIG. 6 is a graph showing an example of how prediction error can be used to select different prediction methods for different lookahead times according to an example embodiment.

FIG. 6 is a graph showing an example of how prediction error can be used to select different prediction methods for different lookahead times. Given a lookahead window of 100 minutes and two prediction methods, the combination step (e.g., step 215(*d*) in FIG. 3) selects different methods for different lookahead times based on the mean absolute prediction errors of these methods in a validation set. In this example, the prediction step (e.g., step 215(*e*) in FIG. 4) uses Method 1 for predicting the client counts at lookahead times from the $10^{th}$ minute to the $40^{th}$ minute, and uses Method 2 for predicting the client counts at lookahead times from the $50^{th}$ minute to the $100^{th}$ minute. More generally, Method 1 may be used to predict client counts up to a predetermined lookahead time, which may be determined based on a comparison of the prediction error for Method 1 and Method 2, and Method 2 may be used to predict client counts after the predetermined lookahead time.

Using the example shown in FIGS. 4 and 5, the forecasting techniques presented herein were evaluated by downsampling the $50^{th}$ percentile of client counts in 10-minute intervals, using a training set of 4 weeks of data, and look-ahead windows of 2 hours and 8 hours.

For an eight-hour look-ahead window, it was found that the forecasting techniques described herein reduce MAPE for predicting client counts in different zones. The average MAPE of the NaïveLast method is 58.8%. Compared to this method, the forecasting techniques presented herein reduce the average error by 38.7%. For example, when comparing the predictive methods described herein in zones having weak seasonality and low counts, it was found that the VectorAR method which exploits the short-term correlation of client counts within and between different zones helps reduce MASE in comparison with the NaïveLast method for longer lookahead times (e.g., over 160 minutes). For strong seasonality client count time series, exploiting the seasonality and the short-term correlation of client counts can improve client prediction. Thus, in zones having strong seasonality, it was found that methods such as STL.NaïveLast and STL.Vector AR reduce MASE significantly in comparison with VectorAR for longer lookahead times. The results also showed that:

First, exploiting correlation of client counts over seasonal spans (weeks) helps improve forecasting performance. Second, after time-series decomposition, exploiting correlation of client counts in a recent time helps improve forecasting performance. Third, exploiting the correlation of client counts between different zones helps improve forecasting performance.

For a two-hour look-ahead window, it was found that NaïveLast provided similar performance to the other methods with less computational time. The MAPE of NaiveLast approach is 29%. NaïveLast was also found to be the best approach for doing forecasting from 10 to 30 minutes.

It was also found that combinations of time-series decomposition and a univariate model outperform NaïveLast and other approaches for doing forecasting from 30 to 160 minutes, and, as mentioned above, for zones with strong seasonality, a combination of time-series decomposition and VectorAR (e.g., STL.VectorAR) outperforms other approaches from 160 minutes to eight hours.

These findings explain why the combination of time-series decomposition and VectorAR may be the best approach for an 8 eight-hour look-ahead window and Naive-Last may be the best approach for two-hour look-ahead window on average. Also, they indicate that it is possible to combine the techniques presented herein and the NaiveLast approach to improve forecasting performance.

To summarize, an efficient process is provided that exploits features in historical and current client location data to forecast client counts of different zones in several hours ahead. These features are obtained from correlations of client counts of multiple zones in a recent and long period of time. This process provides better forecast/prediction on the zone-based client count data, and is very useful in customer analytics which can now show the future predicted value. This can help the analytics customers to plan their operations based on the location analytics.

Figure 7:
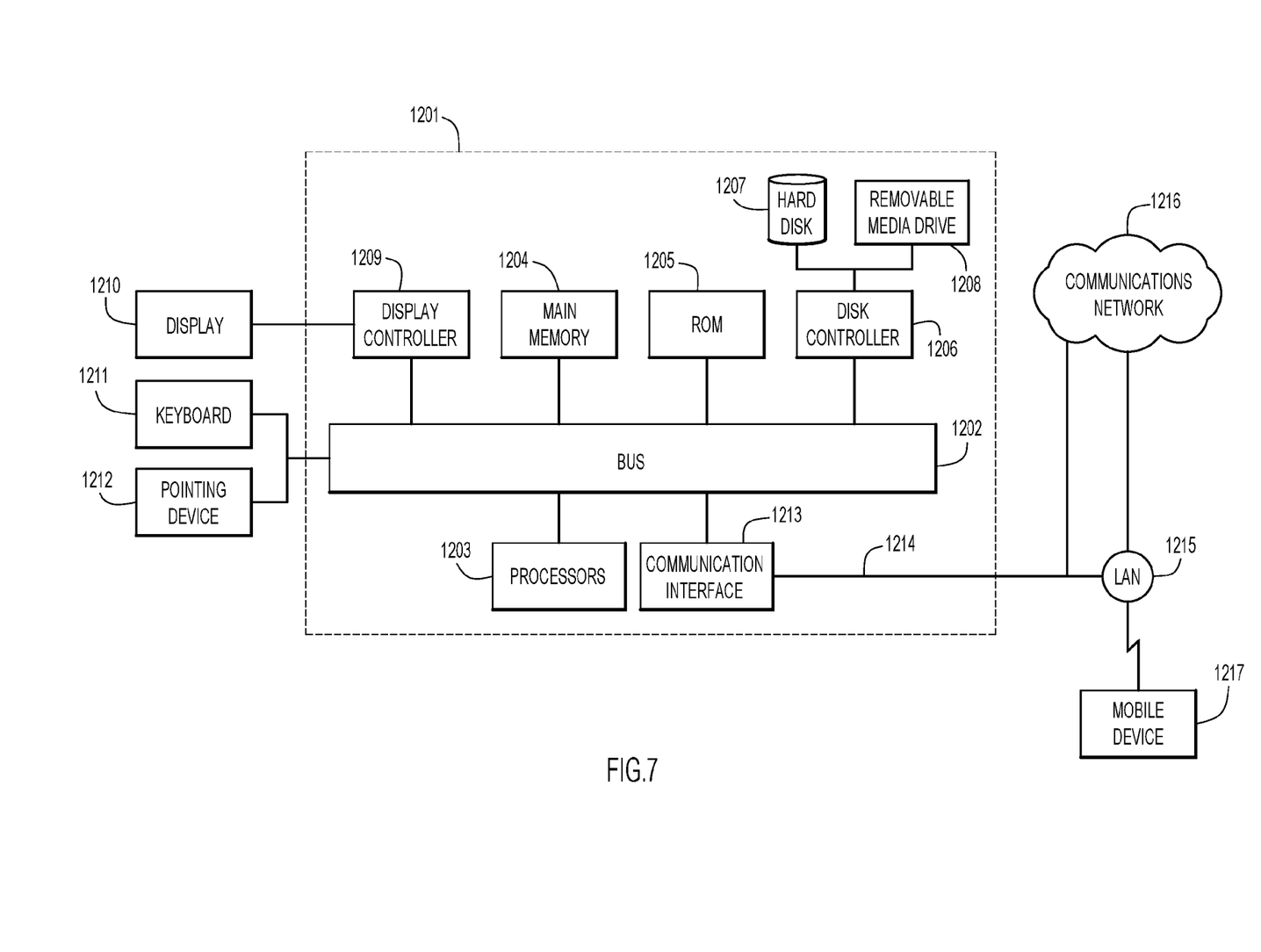
FIG. 7 is a block diagram showing a server configured to perform efficient zone based client count forecasting according to an example embodiment.

FIG. 7 illustrates a computer system 1201 upon which the embodiments presented may be implemented. The computer system 1201 may be programmed to implement a computer based device, such as a server, for zone-based client count forecasting. The computer system 1201 includes a bus 1202 or other communication mechanism for communicating information, and a processor 1203 coupled with the bus 1202 for processing the information. While the figure shows a signal block 1203 for a processor, it should be understood that the processors 1203 represent a plurality of processing cores, each of which can perform separate processing. The computer system 1201 also includes a main memory 1204, such as a random access memory (RAM) or other dynamic storage device (e.g., dynamic RAM (DRAM), static RAM (SRAM), and synchronous DRAM (SD RAM)), coupled to the bus 1202 for storing information and instructions to be executed by processor 1203. In addition, the main memory 1204 may be used for storing temporary variables or other intermediate information during the execution of instructions by the processor 1203.

The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 1201 may also include a display controller 1209 coupled to the bus 1202 to control a display 1210, such as a cathode ray tube (CRT), for displaying information to a computer user. The computer system 1201 includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the process in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 1201, for driving a device or devices for implementing the process, and for enabling the computer system 1201 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a wired or wireless network interface card to attach to any packet switched (wired or wireless) LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local are network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

In summary, a method is provided comprising: at a server in communication with one or more wireless access point devices, obtaining information of a location for a plurality of wireless client devices over a period of time based on a plurality of measurement data associated with signals received at the one or more wireless access point devices from respective ones of the plurality of wireless client devices located in one or more zones; determining at the server a historical client count time series within each of the zones based on the location for each of the client devices over the period of time and map information of the one or more zones; predicting at the server client counts in at least one of the zones over a specified window of time in the future by selecting one or more predictive methods from a plurality of stored predictive methods and generating predicted client counts in at least one of the zones for the specified window of time using the selected one or more predictive methods and the historical client count time series; and reporting predicted client counts in at least one of the zones.

In addition, one or more computer readable storage media encoded with software is provided comprising computer executable instructions and when the software is executed operable to: obtain information of respective locations of one or more wireless client devices based on a plurality of measurement data associated with signals received at one or more wireless access point devices deployed in one or more zones of a geographic area; determine a historical client count time series within each of the zones based on the location for each of the client devices over the period of time and map information of the one or more zones; predict client counts in at least one of the zones over a specified window of time in the future by selecting one or more predictive methods from a plurality of stored predictive methods and generating predicted client counts in at least one of the zones for the specified window of time using the selected one or more predictive methods and the historical client count time series; and report predicted client counts in at least one of the zones.

Furthermore, an apparatus is provided comprising: a communication interface configured to enable network communications; a processing device coupled with the communication interface, and configured to: receive via the communication interface information of respective locations of one or more wireless client devices based on a plurality of measurement data associated with signals received at one or more wireless access point devices deployed in one or more zones of a geographic area; determine a historical client count time series within each of the zones based on the location for each of the client devices over the period of time and map information of the one or more zones; predict client counts in at least one of the zones over a specified window of time in the future by selecting one or more predictive methods from a plurality of stored predictive methods and generating predicted client counts in at least one of the zones for the specified window of time using the selected one or more predictive methods and the historical client count time series; and report predicted client counts in at least one of the zones.

While the techniques presented herein are described as being performed by a server in communication with one or more wireless access points via a wireless network controller, it will be appreciated that the server can be a network controller in direct communication with one or more wireless access points. Furthermore, the operations may be divided between one or more servers. For example, a network controller in communication with a plurality of wireless access points may determine client counts in each zone based on signal strength (or some other technique) and map data, and provide the client count data to another server for forecasting. Also, while specific predictive methods have been described by way of example, it should be understood that the techniques presented herein may be performed using fewer than all of the methods. Other predictive methods may also be used in addition to or in lieu of one or more of the disclosed methods. The operations described herein can be performed continuously, at scheduled times, in response to predetermined conditions, or at the request of a user. The operations may be performed in a different order than shown and described. Furthermore, it should be understood that some of the operations, such as the predictions using different methods, can be performed in parallel. It should also be understood that selection of predictive methods based on a comparison of prediction error may be performed dynamically every time client counts in a zone are to be predicted, or the results of a previous selection may be stored and used for subsequent predictions until another comparison is made.

The above description is intended by way of example only. Various modifications and structural changes may be made therein without departing from the scope of the concepts described herein and within the scope and range of equivalents of the claims.

What is claimed is:

1. A method comprising:
at a server in communication with one or more wireless access point devices, obtaining information of a location for each of a plurality of wireless client devices over a period of time based on a plurality of measurement data associated with signals received at the one or more wireless access point devices from respective ones of the plurality of wireless client devices located in one or more zones;
determining at the server a historical client count time series within each of the zones based on the location for each of the client devices over the period of time and map information of the one or more zones, wherein determining the historical client count time series includes down-sampling the $p^{th}$ percentile of client counts in each zone over a plurality of time intervals;
predicting at the server client counts in at least one of the zones over a specified window of time in the future by selecting one or more predictive methods from a plurality of stored predictive methods and generating predicted client counts in at least one of the zones for the specified window of time using the selected one or more predictive methods and the historical client count time series; and
reporting predicted client counts in at least one of the zones.

2. The method of claim 1, wherein selecting one or more predictive methods includes selecting a first predictive method for a first lookahead time and selecting a second predictive method different than the first predictive method for a second lookahead time that is different than the first lookahead time.

3. The method of claim 2, wherein the selecting is based on a comparison of prediction error for each of the plurality of predictive methods.

4. The method of claim 2, wherein the first lookahead time is up to two hours and selecting a first predictive method includes selecting a naïve method to generate a predicted client count.

5. The method of claim 4, wherein selecting a second predictive method includes selecting at least one of an exponential smoothing model, an autoregressive integrated moving average model, or a vector autoregressive model to generate a predicted client count.

6. The method of claim 2, wherein generating a predicted client count includes using the first predictive method up to a predetermined lookahead time and using the second predictive method after the predetermined lookahead time.

7. The method of claim 1, further comprising performing a time series decomposition of each historical client count time series into a season time series and a seasonally adjusted time series.

8. The method of claim 7, further comprising dividing the down-sampled client count time series into a training set and a validation set, training a predictive model using the training set, and predicting client counts using the validation set.

9. The method of claim 7, wherein predicting client counts includes correlating client counts within and between down-sampled client count time series.

10. An apparatus comprising:
a communication interface configured to enable network communications;
a processing device coupled with the communication interface, and configured to:
receive via the communication interface information of respective locations of one or more wireless client devices based on a plurality of measurement data associated with signals received at one or more wireless access point devices deployed in one or more zones of a geographic area;
determine a historical client count time series within each of the zones based on the location for each of the client devices over the period of time and map information of the one or more zones, wherein determining the historical client count time series includes down-sampling the $p^{th}$ percentile of client counts in each zone over a plurality of time intervals;
predict client counts in at least one of the zones over a specified window of time in the future by selecting one or more predictive methods from a plurality of stored predictive methods and generating predicted client counts in at least one of the zones for the specified window of time using the selected one or more predictive methods and the historical client count time series; and report predicted client counts in at least one of the zones.

11. The apparatus of claim 10, wherein the processing device is further configured to select a first predictive method for a first lookahead time and select a second predictive method different than the first predictive method for a second lookahead time after the first lookahead time.

12. The apparatus of claim 11, wherein the processing device is further configured to select the first and second predictive methods based on a comparison of prediction error for each of the plurality of predictive methods.

13. The apparatus of claim 11, wherein the processing device is further configured to select a naïve method as the first predictive method and at least one of an exponential smoothing model, an autoregressive integrated moving average model, or a vector autoregressive model as the second predictive method.

14. The apparatus of claim 11, wherein the processing device is further configured to select a naïve method as the first predictive method and a method including time-series decomposition as the second predictive method.

15. A non-transitory computer-readable storage media encoded with software comprising computer executable instructions and when the software is executed operable to:

obtain information of respective locations of one or more wireless client devices based on a plurality of measurement data associated with signals received at one or more wireless access point devices deployed in one or more zones of a geographic area;

determine a historical client count time series within each of the zones based on the location for each of the client devices over the period of time and map information of the one or more zones, wherein determining the historical client count time series includes down-sampling the $p^{th}$ percentile of client counts in each zone over a plurality of time intervals;

predict client counts in at least one of the zones over a specified window of time in the future by selecting one or more predictive methods from a plurality of stored predictive methods and generating predicted client counts in at least one of the zones for the specified window of time using the selected one or more predictive methods and the historical client count time series; and report predicted client counts in at least one of the zones.

16. The non-transitory computer-readable storage media of claim 15, wherein the instructions operable to select comprise instructions operable to select a first predictive method for a first lookahead time and select a second predictive method different than the first predictive method for a second lookahead time after the first lookahead time.

17. The non-transitory computer-readable storage media of claim 16, wherein the instructions operable to select comprise instructions operable to select the first and second predictive methods based on a comparison of prediction error for each of the plurality of predictive methods.

18. The non-transitory computer-readable storage media of claim 17, wherein the instructions operable to select comprise instructions operable to select a naïve method as the first predictive method and at least one of an exponential smoothing model, an autoregressive integrated moving average model, or a vector autoregressive model as the second predictive method.

19. The non-transitory computer-readable storage media of claim 17, wherein the instructions operable to select comprise instructions operable to select a naïve method as the first predictive method and a method including time-series decomposition as the second predictive method.

* * * * *